(12) United States Patent
Yoo et al.

(10) Patent No.: US 11,159,838 B2
(45) Date of Patent: Oct. 26, 2021

(54) ELECTRONIC APPARATUS, CONTROL METHOD THEREOF AND ELECTRONIC SYSTEM

(71) Applicant: SAMSUNG ELECTRONICS CO., LTD., Suwon-si (KR)

(72) Inventors: Eunjin Yoo, Suwon-si (KR); Youngjong Boo, Suwon-si (KR); Songah Choi, Suwon-si (KR); Won Nah, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/552,156

(22) Filed: Aug. 27, 2019

(65) Prior Publication Data

US 2020/0137444 A1 Apr. 30, 2020

(30) Foreign Application Priority Data

Oct. 31, 2018 (KR) .................. 10-2018-0131879

(51) Int. Cl.
*H04N 21/262* (2011.01)
*H04N 21/233* (2011.01)
(Continued)

(52) U.S. Cl.
CPC ..... *H04N 21/26283* (2013.01); *H04N 21/233* (2013.01); *H04N 21/42204* (2013.01);
(Continued)

(58) Field of Classification Search
CPC ........... H04N 21/26283; H04N 21/233; H04N 21/42204; H04N 21/439; H04N 21/4821;
(Continued)

(56) References Cited

U.S. PATENT DOCUMENTS 8,528,019 B1  9/2013 Dimitrova et al.
2002/0152224 A1* 10/2002 Roth .................. H04N 21/2668
(Continued)

FOREIGN PATENT DOCUMENTS

KR        10-1143942        5/2012
KR    10-2014-0020119        2/2014
(Continued)

OTHER PUBLICATIONS

Extended European Search Report dated Dec. 5, 2019 in European Patent Application No. 19199679.2.

*Primary Examiner* — Alexander Gee
(74) *Attorney, Agent, or Firm* — Staas & Halsey LLP

(57) ABSTRACT

An electronic apparatus according to an embodiment includes a communicator, and a processor configured to, based on multimedia data being received from an external device through the communicator, obtain word-related information during a time period from audio data included in the
(Continued)

multimedia data, control the communicator to transmit identification information including the word-related information and time information corresponding to the time period to a server, and receive broadcast provider information corresponding to the transmitted identification information from the server through the communicator.

15 Claims, 12 Drawing Sheets

(51) Int. Cl.
    *H04N 21/422*     (2011.01)
    *H04N 21/439*     (2011.01)
    *H04N 21/482*     (2011.01)
    *H04N 21/8543*    (2011.01)
    *H04H 60/48*      (2008.01)
    *H04H 60/44*      (2008.01)
    *H04N 21/258*     (2011.01)
    *H04N 21/4722*    (2011.01)
    *H04N 21/462*     (2011.01)
    *H04N 21/4402*    (2011.01)

(52) U.S. Cl.
    CPC ....... *H04N 21/439* (2013.01); *H04N 21/4821* (2013.01); *H04N 21/8543* (2013.01)

(58) Field of Classification Search
    CPC ........... H04N 21/8543; H04N 21/4392; H04N 21/235; H04N 21/2353; H04N 21/435; H04N 21/4394
    See application file for complete search history.

(56) References Cited

U.S. PATENT DOCUMENTS

| | | | |
|---|---|---|---|
| 2014/0215525 A1* | 7/2014 | Jeong | H04N 21/25891 725/46 |
| 2014/0373036 A1* | 12/2014 | Phillips | H04N 21/42203 725/12 |
| 2015/0229421 A1* | 8/2015 | Anniballi | H04H 60/43 455/3.02 |
| 2015/0312629 A1* | 10/2015 | Bugajski | H04N 21/4312 725/59 |
| 2015/0334459 A1* | 11/2015 | Oh | H04N 21/8133 725/113 |
| 2016/0198200 A1 | 7/2016 | Choi | |
| 2016/0198227 A1* | 7/2016 | Singh | H04N 21/6143 725/32 |
| 2018/0205977 A1 | 7/2018 | Choi | |
| 2018/0365233 A1* | 12/2018 | Cherian | G06F 40/58 |
| 2019/0287415 A1* | 9/2019 | Zavesky | G09B 5/065 |

FOREIGN PATENT DOCUMENTS

| | | |
|---|---|---|
| KR | 10-2016-0085076 | 7/2016 |
| KR | 10-2017-0138788 | 12/2017 |

* cited by examiner

FIG. 8

| BROADCAST PROVIDER | CHANNEL NUMBER | TIME PERIOD | | | |
|---|---|---|---|---|---|
| | | 9:00~9:10 | 9:10~9:20 | 9:20~9:30 | ... |
| A | 5 | father 10<br>new 5<br>berry 4 | father 15<br>berry 9<br>cake 1 | ... | |
| | 7 | ⋮ | ⋮ | ⋮ | |
| | 11 | | | | |
| | ⋮ | | | | |
| B | 5 | | | | |
| | 11 | | | | |
| | 13 | | | | |
| | ⋮ | | | | |

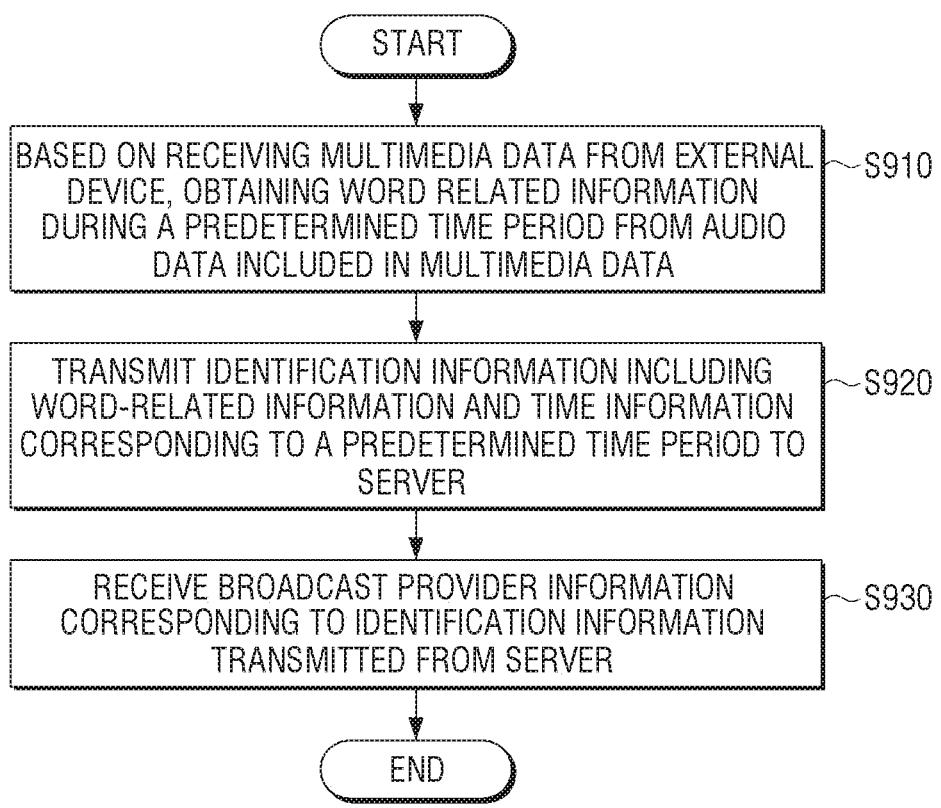

ELECTRONIC APPARATUS, CONTROL METHOD THEREOF AND ELECTRONIC SYSTEM

CROSS-REFERENCE TO RELATED APPLICATION(S)

This application is based on and claims priority under 35 U.S.C. § 119 to Korean Patent Application No. 10-2018-0131879, filed on Oct. 31, 2018, in the Korean Intellectual Property Office, the disclosure of which is incorporated by reference herein in its entirety.

BACKGROUND

1. Field

The disclosure relates to an electronic apparatus, a controlling method thereof, and an electronic system, and more particularly, to an electronic apparatus for identifying broadcasting provider information, a controlling method thereof, and an electronic system.

2. Description of Related Art

With the development of electronic technology, various types of electronic apparatuses have been developed and widely used. Particularly, electronic apparatuses for providing a commercial service, a voice service, or a contents recommendation service based on user's content viewing history have been widely used. In order to provide such services, it is required to receive Electronic Program Guide (EPG) information corresponding to a broadcasting provider.

However, a conventional method comprises performing automatic content recognition after capturing a content displayed in a screen, extracting a template corresponding to a broadcasting server (a logo including text information corresponding respective servers and image information) and transmitting the extracted template to a separate server, wherein the server compares the received template with the stored template and determines a broadcasting server.

Therefore, according to the conventional method, there is a problem in that a user may find it inconvenient to receive a template from a broadcasting provider, and even if the template is received, only a broadcasting server may be identified, not a broadcasting provider.

SUMMARY

An aspect of the embodiments relates to providing an electronic apparatus for reducing costs by identifying broadcast provider information without a template, a controlling method, and an electronic system.

Additional aspects will be set forth in part in the description which follows and, in part, will be apparent from the description, or may be learned by practice of the presented embodiments.

According to an embodiment, an electronic apparatus includes a communicator, and a processor configured to, based on multimedia data being received from an external device through the communicator, obtain word-related information during a time period from audio data included in the multimedia data, control the communicator to transmit identification information including the word-related information and time information corresponding to the time period to a server, and receive broadcast provider information corresponding to the transmitted identification information from the server through the communicator.

The processor may be further configured to control the communicator to transmit the broadcast provider information to another server, and based on broadcast guide information corresponding to the broadcast provider being received from the another server through the communicator, provide at least one of a commercial service, a voice service, or a content recommendation service based on the broadcast guide information.

The processor may be further configured to identify a channel number from video data included in the multimedia data, control the communicator to transmit at least one of the channel number or IP information of the electronic apparatus to the server along with the identification information, and receive the broadcast provider information from the server through the communicator.

The apparatus may further include a display, wherein the processor is further configured to control the display to sequentially display a plurality of frames included in the video data, and identify the channel number from a displayed frame among the plurality of frames.

The processor may be further configured to convert audio data during the time period into text, identify a frequency by word included in the audio data based on the text, and obtain word-related information including information on words of a predetermined frequency or more.

The memory may further include a memory, wherein the processor is further configured to control the communicator to transmit a control code set corresponding to the broadcast provider information among a plurality of control code sets stored in the memory to a remote control device.

Time information corresponding to the time period may include a reproduction time point of the multimedia data corresponding to the time period.

The processor may be further configured to control the communicator to transmit first identification information including a first reproduction time point of the multimedia data corresponding to the time period and corresponding word-related information, and second identification information including a second reproduction time point of the multimedia data corresponding to the time period and corresponding word-related information to the server.

The apparatus may further include a memory, wherein the processor is further configured to store the received broadcast provider information in the memory, and based on identification information being obtained from the multimedia data after the broadcast provider information is received, control the communicator to transmit the obtained identification information to the server along with the broadcast provider information.

According to an embodiment, an electronic system includes a server configured to store word-related information database by time period corresponding to each broadcast provider, and an electronic apparatus configured to obtain word-related information during a time period from audio data included in multimedia data received from an external device, and transmit identification information including the word-related information and time information corresponding to the time period to the server, wherein the server is further configured to identify broadcast provider information corresponding to the identification information based on the word-related information database, and transmit the identified broadcast provider information to an electronic apparatus.

The server may be further configured to update the word-related information database based on broadcast provider information received from another electronic apparatus, and word-related information by time period corresponding to the broadcast provider information.

The word-related information database may include word-related information respectively corresponding to a plurality of channels provided through the broadcast provider for each time period, and wherein the server is further configured to, based on the identification information and a channel number corresponding to the identification information being received from the electronic apparatus, identify the identification information and broadcast provider information corresponding to the channel number based on the word-related information database, and transmit the identified broadcast provider information to the electronic apparatus.

The word-related information may include a frequency for each of a plurality of words obtained during the time period, wherein the server is further configured to, based on a plurality of broadcast providers being identified from the word-related information database based on the plurality of words, identify one of the plurality of identified broadcast providers based on the frequency for each of the plurality of words.

The identification information may include word-related information corresponding to each of a plurality of time periods, wherein the server is further configured to, based on broadcast provider information respectively coinciding with the word-related information based on the word-related information database, transmit the broadcast provider information to the electronic apparatus.

According to an embodiment, a controlling method of an electronic apparatus includes based on multimedia data being received from an external device, obtaining word-related information during a time period from audio data included in the multimedia data, transmitting identification information including the word-related information and time information corresponding to the time period to a server, and receiving broadcast provider information corresponding to the transmitted identification information from the server.

The method may further include transmitting the broadcast provider information to another server, and based on broadcast guide information corresponding to the broadcast provider being received from the another server, providing at least one of a commercial service, a voice service, or a content recommendation service based on the broadcast guide information.

The method may further include identifying a channel number from video data included in the multimedia data, wherein the transmitting comprises transmitting at least one of the channel number or IP information of the electronic apparatus to the server along with the identification information.

The method may further include displaying a plurality of frames included in the video data sequentially, wherein the identifying comprises identifying the channel number from a displayed frame among the plurality of frames.

The obtaining may include converting audio data during the time period into context, identifying a frequency by word included in the audio data based on the text, and obtaining word-related information including information on words of a predetermined frequency or more.

The method may further include transmitting a control code set corresponding to the broadcast provider information among a plurality of control code sets to a remote control device.

According to the above-described various embodiments, an electronic apparatus may obtain word-related information from audio data, transmit the information to a server, and receive broadcast provider information obtained from the server based on the word related information.

BRIEF DESCRIPTION OF THE DRAWINGS

The above and other aspects, features, and advantages of particular embodiments of the present disclosure will be more apparent from the following description taken in conjunction with the accompanying drawings, in which:

FIG. 8 is a view to explain a broadcasting provider identification method according to an embodiment of the disclosure; and FIG. 9 is a flowchart to explain a control method of an electronic apparatus according to an embodiment of the disclosure.

DETAILED DESCRIPTION

Figure 1:
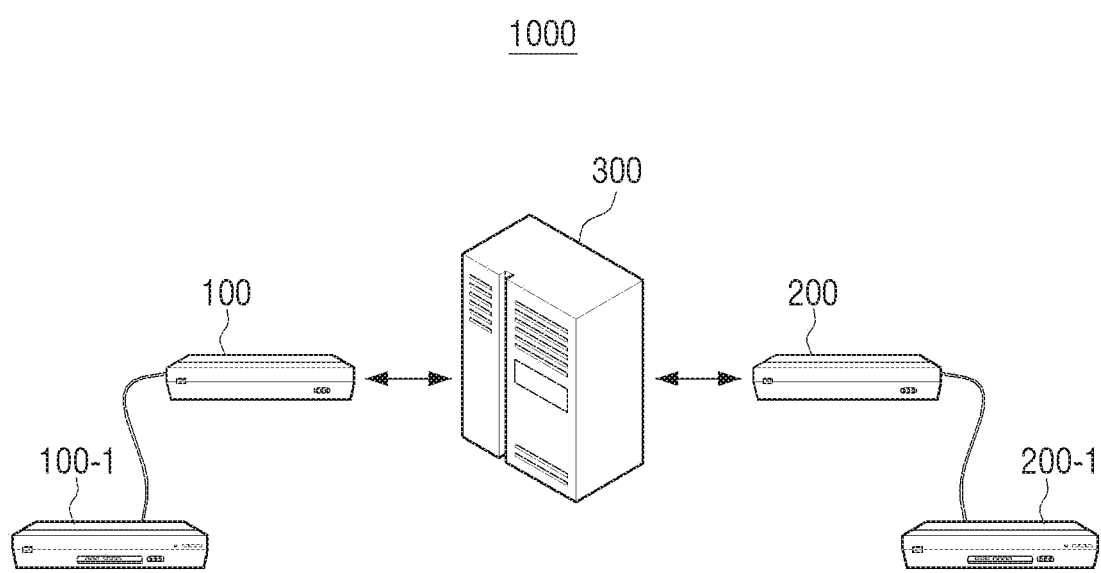
FIG. 1 is a view illustrating an electronic system according to an embodiment of the disclosure.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail because they would obscure the disclosure with unnecessary detail.

Hereinafter, the disclosure will be described in detail with reference to the accompanying drawings.

All the terms used in this specification including technical and scientific terms have the same meanings as would be generally understood by those skilled in the related art. However, these terms may vary depending on the intentions of the person skilled in the art, legal or technical interpretation, and the emergence of new technologies. In addition, some terms are arbitrarily selected by the applicant. These terms may be construed in the meaning defined herein and, unless otherwise specified, may be construed on the basis of the entire contents of this specification and common technical knowledge in the art.

In this specification, terms such as 'include' and 'have/has' should be construed as designating that there are such features, numbers, operations, elements, components or a combination thereof in the specification, not to exclude the existence or possibility of adding one or more of other features, numbers, operations, elements, components or a combination thereof.

In the disclosure, the expressions "A or B," "at least one of A and/or B," or "one or more of A and/or B," and the like include all possible combinations of the listed items.

Terms such as 'first' and 'second' may be used to modify various elements regardless of order and/or importance. Those terms are only used for the purpose of differentiating a component from other components.

When an element (e.g., a first constituent element) is referred to as being "operatively or communicatively coupled to" or "connected to" another element (e.g., a second constituent element), it should be understood that each constituent element is directly connected or indirectly connected via another constituent element (e.g., a third constituent element).

The singular expression also includes the plural meaning as long as it does not differently mean in the context. In this specification, terms such as 'include' and 'have/has' should be construed as designating that there are such features, numbers, operations, elements, components or a combination thereof in the specification, not to exclude the existence or possibility of adding one or more of other features, numbers, operations, elements, components or a combination thereof.

In an exemplary embodiment, 'a module', 'a unit', or 'a part' perform at least one function or operation, and may be realized as hardware, such as a processor or integrated circuit, software that is executed by a processor, or a combination thereof. In addition, a plurality of 'modules', a plurality of 'units', or a plurality of 'parts' may be integrated into at least one module or chip and may be realized as at least one processor except for 'modules', 'units' or 'parts' that should be realized in a specific hardware.

In this specification, a user may refer to a person who uses an electronic apparatus or, an apparatus for using an electronic apparatus (e.g., an artificial intelligence electronic apparatus).

Hereinafter, the example embodiment of the disclosure will be described in more detail with reference to accompanying drawings.

FIG. 1 is a view illustrating an electronic system according to an embodiment of the disclosure. Referring to FIG. 1, an electronic system 1000 may include an electronic apparatus 100, an external device 100-1, another electronic apparatus 200, another external device 200-1, and a server 300.

The electronic apparatus 100 may receive multimedia data from the external device 100-1, and execute the received multimedia data. For example, the electronic apparatus 100 may include a display such as a TV, a desktop PC, a laptop, a digital video disk (DVD) player, a smart phone, a tablet PC, a monitor, smart glasses, a smart watch, etc., and reproduce the multimedia data received from an external device such as a set-top box (STB). In this case, the electronic apparatus 100 may control a display to display the received multimedia data.

The electronic apparatus 100 may be an apparatus without a display such as a speaker, a computer body, etc. In this case, the electronic apparatus 100 may transmit multimedia data received from an external device such as a set-top box to an apparatus with a display. The electronic apparatus 100 may transmit a control command to the apparatus with the display so that the transmitted multimedia data may be displayed.

The electronic apparatus 100 may be separated from a display device, and perform a main function such as an image processing function among various functions of the display device, and transmitting only the image processing result to the display device. In this case, the display device may be miniaturized, and the electronic apparatus 100 may receive multimedia data from a set-top box, and transmit the received multimedia data to the display device. The electronic apparatus 100 may receive contents from an external content server, a broadcast station server, etc., and transmit multimedia data corresponding to a content after image processing to the display device.

In other words, any type of apparatus could be used as long as it receives multimedia data from the external device 100-1. The external device 100-1 may be an external content server, a broadcast station server, a satellite cable server, etc. as well as a set-top box as long as it provides multimedia data to the electronic apparatus 100. The multimedia data may include at least one of video data or audio data.

The external device 100-1 may vary, and differently operate according to a broadcast provider. For example, the external device 100-1 provided by the first broadcast provider may provide the first to $100^{th}$ channels, and the external device 100-1 provided by the second broadcast provider may provide the $51^{st}$ to $200^{th}$ channels. In other words, at least one of the number of channels, the channel number, or the broadcast station mapped with the channel may vary depending on which broadcast provider provides the external device 100-1.

The electronic apparatus 100 may not store broadcast provider information corresponding to the external device 100-1. In other words, the electronic apparatus 100 may be an apparatus that executes multimedia data received from the external device 100-1, but cannot identify which broadcast provider the received multimedia data is provided from.

The another electronic apparatus 200 may receive multimedia data from the other external device 200-1 in the same manner as the electronic apparatus 100, and execute the received multimedia data. The other external device 200-1 may provide multimedia data to the another electronic apparatus 200 in the same manner as the external device 100-1. The only difference between the external device 100-1 and the other external device 200-2 may be a target to which multimedia data is provided, and the broadcast provider may be the same or different.

The another electronic apparatus 200 may be an apparatus that stores broadcast provider information corresponding to the other external device 200-1 unlike the electronic apparatus 100. For example, the another electronic apparatus 200 may be an apparatus in which the external device 200-1 is a device of the first broadcast provider, and the another electronic apparatus 200 may receive broadcast guide information such as Electronic Program Guide (EPG), etc. provided by the first broadcast provider and identify a content corresponding to the multimedia data.

When information on the other external device 200-1 is provided at the time of initial installment of the another electronic apparatus 200, a provider of the another electronic apparatus 200 may input broadcast provider information corresponding to the other external device 200-1 into the another electronic apparatus 200. However, when the electronic apparatus 100 is first installed, information on the external device 100-1 may not be provided because the external device 100-1 is not installed, and the provider of the electronic apparatus 100 cannot input the broadcast provider information corresponding to the external device 100-1 into the electronic apparatus 100. The user of the electronic apparatus 100 may use the electronic apparatus 100 without inputting the broadcast provider information into the electronic apparatus 100 because a general content can be reproduced without setting broadcast provider information corresponding to the external device 100-1 even if the external device 100-1 is installed. The electronic apparatus 100 may not include broadcast provider information, and thus it cannot provide an additional function using the broadcast provider information. The additional function will be described below.

The electronic apparatus 100 and the another electronic apparatus 200 may obtain identification information including word related information from the multimedia data and transmit the identification information to the server 300. The another electronic apparatus 200 may transmit the broadcast provider information to the server together with the identification information. The method for obtaining the word-related information of the electronic apparatus 100 may be the same as the method for obtaining the word-related information of the another electronic apparatus 200.

The server 300 may generate a word related database based on the identification information received from the another electronic apparatus 200 and the broadcast provider information. FIG. 1 illustrates that the another electronic apparatus 200 is a single one for ease of explanation, but in the actual implementation, the another electronic apparatus 200 may include a plurality of electronic apparatuses, and the server 300 may receive identification information and broadcast provider information from each of the plurality of electronic apparatuses 200, and generate the word related information database. The word related information database may include word related information corresponding to each of a plurality of channels provided through a broadcast provider for each time period.

The server 300 may identify the broadcast provider information including word related information same as word related information included in the identification information received from the electronic apparatus 100, and transmit the identified broadcast provider information to the electronic apparatus 100.

Through the above-described operation, the electronic apparatus 100 may automatically obtain broadcast provider information through the another electronic apparatus 200 and the server 300, and provide an additional function using the broadcast provider information.

Figure 2A:
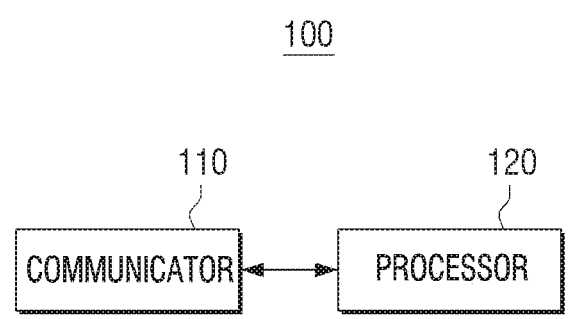
FIG. 2A is a block diagram illustrating an example of configurations of an electronic apparatus.

FIG. 2A is a block diagram illustrating an example of configurations of an electronic apparatus 100.

Referring to FIG. 2A, the electronic apparatus 100 may include a communicator 110 and a processor 120.

The communicator 110 may include a configuration for performing communication with various devices. For example, the communicator 110 may support various communication interfaces such as BlueTooth (BT), Bluetooth Low Energy (BLE), Wireless Fidelity (WI-FI), and Zigbee. However, the disclosure is not limited to this, and any communication interface may be used as long as wireless communication is possible.

Further, the communicator 110 may include an input/output interface capable of wired communication with various devices. For example, the communicator 110 may include input/output interfaces such as HDMI, MHL, USB, RGB, D-SUB, and DVI, and perform communication with various devices.

The electronic apparatus 100 may be connected to the external device 100-1 to receive multimedia data. In this case, the electronic apparatus 100 may be connected to the external device 100-1 through an input/output interface such as HDMI, DP, Thunderbolt, USB, RGB, D-SUB, DVI, etc. In addition, the input/output interface may include a standard for performing video input and audio input through one port as well as a standard for performing video input and audio input through two ports.

However, the present disclosure is not limited to this, and the input/output interface may operate according to any standard as long as it can perform at least one of video input or audio input.

The communicator 110 may include an input/output interface of all communication standards capable of performing wired communication with various devices other than the above-described input/output interface.

The processor 120 may control the overall operations of the electronic apparatus 100.

According to an embodiment, the processor 120 may be implemented as a digital signal processor (DSP), a microprocessor, or a time controller (TCON), but is not limited thereto. The processor 120 may include one or more central processing unit (CPU), a microcontroller unit (MCU), a micro processing unit (MPU), a controller, an application processor (AP), or a communication processor (CP), an ARM processor, and the like, or may be defined by the corresponding terms. The processor 120 may be implemented as a system on chip (SoC), a large scale integration (LSI) with a built-in processing algorithm, or in the form of a field programmable gate array (FPGA). The processor 120 may perform various functions by executing computer executable instructions stored in the memory 120.

When receiving multimedia data from the external device 100-1 through the communicator 110, the processor 120 may obtain word related information during a time period from audio data included in the multimedia data. For example, the processor 120 may obtain word-related information over a 5-minute time period such as 9:00~9:05, 9:05~9:10 . . . , etc. The processor 120 may obtain word-related information such as "baby" 10 times and "grape" 5 times during 9:00 to 9:05. In this case, the word related information may refer to word distribution obtained during a time period from audio data included in multimedia data.

However, the disclosure is not limited thereto, and the processor 120 may obtain word related information during another time period. For example, the processor 120 may obtain word related information over a 10-minute time period such as 9:00~9:10, 9:10~9:20 . . . .

The processor 120 may determine a time period based on the multimedia data. For example, the processor 120 may determine a time period in which the type of content corresponding to the multimedia data is action to be longer than a time period in which the type is romance. The processor 120 may variably change a time period based on audio data such as there being no dialogue from audio data.

The processor 120 may convert audio data during a time period into text, identify a frequency by word included in audio data based on the text, and obtain word related information including information on words having more than a predetermined frequency. The processor 120 may obtain word related information including all words in a time period, or word related information including part of words in the time period.

However, the disclosure is not limited thereto. The processor 120 may transmit a user voice included in audio data to a voice recognition server, receive text corresponding to the user voice from the voice recognition server, and identify a plurality of words. The processor 120 may transmit a user voice included in the audio data to the voice recognition server, and when the text corresponding to the user voice is received from the voice recognition server, may transmit the received text to a text extraction server, and receive a plurality of words included in the text from the text extraction server. The voice recognition server may be a server that converts audio data into text, and the text extraction server may be a server for extracting words from the text.

The external device 100-1 may be a device such as a set-top box, and the processor 120 may receive multimedia data decoded in the set-top box. The external server 100-1 may be an external content server, a broadcast station server, etc. Any type of apparatus could be used as long as it can provide multimedia data to the electronic apparatus 100.

The processor 120 may control the communicator 110 to transmit identification information including word related information and time information corresponding a time period to the server 300. The time information corresponding to the time period may include a reproduction time point of multimedia data corresponding to the time period. According to the above-described example, the processor 120 may transmit the identification information including word related information of "baby" 10 times, "grape" 5 times, etc. and a reproduction time point of 9:00~9:05.

The processor 120 may receive broadcast provide information corresponding to the identification information transmitted from the server 300 through the communicator 110.

Although the operation corresponding to one time period has been described, the processor 120 may perform the same operation with respect to a plurality of time periods. The processor 120 may control the communicator 110 to transmit first identification information including the first reproduction time point of the multimedia data corresponding to the time period and corresponding word related information, and the second identification information including the second reproduction time point of the multimedia data corresponding to the time period and corresponding word related information to the server 300.

The server 300 may obtain broadcast provider information that provides the multimedia data to the electronic apparatus 100 based on the first identification information and the second identification information, and provide the obtained broadcast provider information to the electronic apparatus 100. The server 300 may provide more accurate broadcast provider information as the electronic apparatus 100 provides a plurality of identification information.

The processor 120 may identify a channel number from video data included in the multimedia data, control the communicator 110 to transmit at least one of the channel number of the IP information to the server 300 together with the identification information, and receive the broadcast provider information from the server 300 through the communicator 110.

For example, the processor 120 may receive multimedia data including On Screen Display) (OSD) information in the case of turn-on, channel change, etc. of the external device 100-1. In this case, the processor 120 may identify a channel number by applying optical character reader (OCR) to the frame including the OSD information. The server 300, based on a channel number being received, reduce a time for searching broadcast provider information, and provide more accurate broadcast provider information.

The electronic apparatus 100 may further include a display, and the processor 120 may control a display to sequentially display a plurality of frames included in video data, and identify a channel frame from a displayed frame among the plurality of frames. The processor 120 may identify a channel number only from the displayed frame.

However, the disclosure is not limited thereto. The processor 120 may identify a channel number from a frame to be displayed.

The electronic apparatus 100 may be an apparatus without a display, and the processor 120 may identify a channel number from a frame regardless of a display of the frame. The processor 120 may provide the frame to the display device, and identify a channel number only for the frame to be provided to the display device.

The processor 120 may transmit the IP information of the electronic apparatus 100 to the server 300 to provide more accurate broadcast provider information. For example, even if the broadcast provider is the same, the channel number may be different according to a region. For example, the broadcast provider A may provide content 1 on channel no. 11 in region A, but on channel no. 5 in region 2. The server 300 may not provide accurate broadcast provider information. When the electronic apparatus 100 provides IP information, the server 300 may provide more accurate broadcast provider information. The server 300 may store a word related database divided according to IP information.

However, the disclosure is not limited thereto. The processor 120 may identify a region in which the electronic apparatus 100 is disposed based on the IP information of the electronic apparatus 100, and transmit the identified region information to the server 300.

The processor 120 may control the communicator 110 to transmit broadcast provider information to another server, and when broadcast guide information corresponding to a broadcast provider is received from another server through the communicator 110, may provide at least one of a commercial service, a voice service or a content recommendation service based on broadcast guide information.

The electronic apparatus 100 may further include a memory, and the processor 120 may control the communicator 110 to transmit a control code set corresponding to the broadcast provider information among a plurality of control code sets stored in the memory to a remote control device. In this case, the remote control device may operate as an integrated remote controller capable of controlling the external device 100-1 as well as the electronic apparatus 100. The processor 120 may receive a plurality of control code sets from the server in which the plurality of control code sets are stored and store the plurality of control code set in the memory. The processor 120 may receive a control code set corresponding to broadcast provider information from the server in which the plurality of control code sets are stored.

When receiving the broadcast provider information, the processor 120 may receive EPG information corresponding to a broadcast provider and identify a content viewed by a user. The processor 120 may provide an advertisement based on the content viewed by the user.

The processor 120 may provide a voice service. For example, when the user utters a voice such as 'what are you doing at 10 tonight?', the processor 120 may provide content information of 10 pm based on the EPG information corresponding to the broadcast provider.

The processor 120 may store user's view history based on EPG information corresponding to a broadcast provider, and provide a content recommendation service based on the user's view history.

The electronic apparatus 100 may further include a memory, and the processor 120 may store the received broadcast provider information in the memory. The electronic apparatus 100, if identification information is obtained from multimedia data after the broadcast provider information is received, control the communicator 110 to transmit the obtained identification information to the server 300 together with the broadcast provider information. The electronic apparatus 100 may operate in the same manner as the another electronic apparatus 100 when the broadcast provider information is received. The description in this regard will be made below.

Figure 2B:
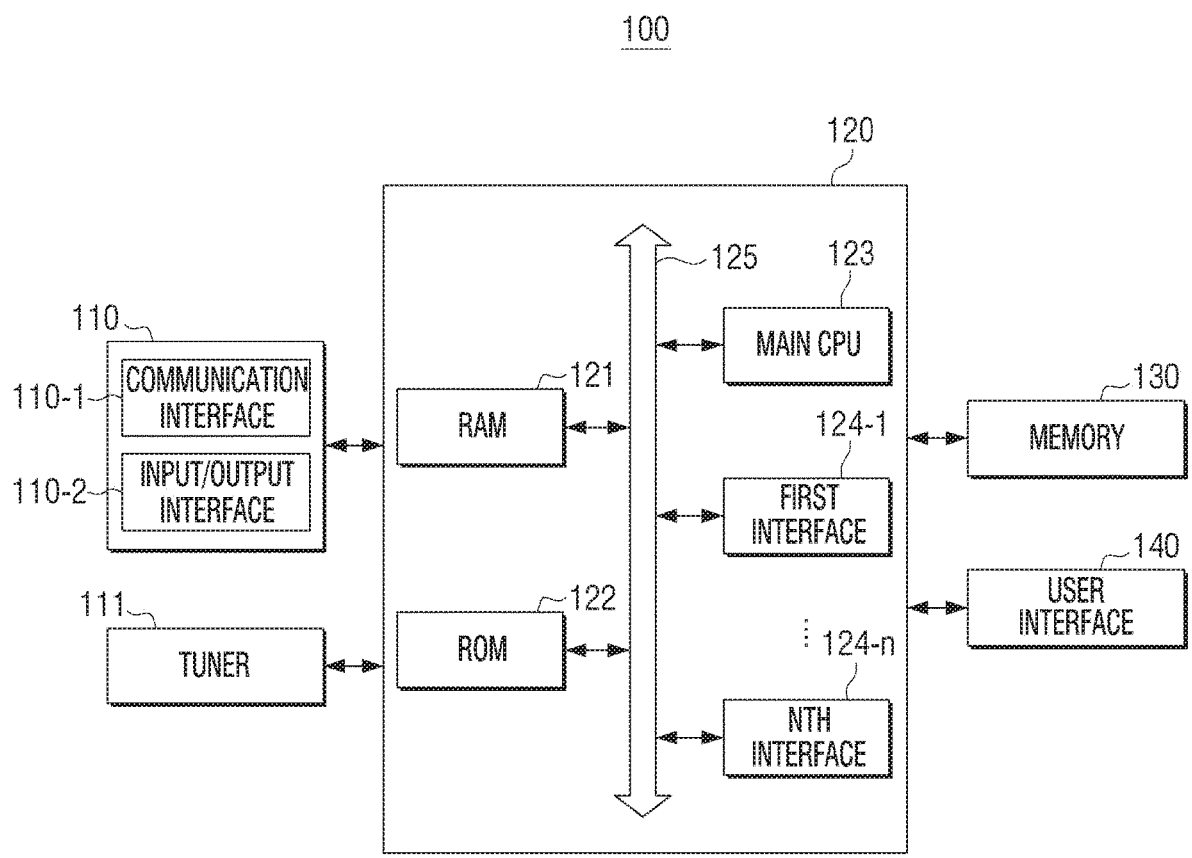
FIG. 2B is a block diagram illustrating an example of detailed configurations of an electronic apparatus.

FIG. 2B is a block diagram illustrating an example of detailed configurations of an electronic apparatus. The electronic apparatus 100 may include the communicator 110 and the processor 120. In addition, according to FIG. 2B, the electronic apparatus 100 may further include a tuner 111, a memory 130, and a user interface 140. The detailed description of constituent elements of FIG. 2B which is repeated in FIG. 2A will be omitted.

The tuner 111 may receive an RF broadcast signal by tuning a channel selected by a user or pre-stored all channels among Radio Frequency (RF) broadcast signals received through antenna. When the electronic apparatus 100 includes an antenna, the communication interface 110-1 may include the antenna. In addition, when the antenna that receives the RF broadcast signal is installed on a rooftop, etc., the input/output interface 110-2 may include a terminal for receiving the RF broadcast signal that is received from an external antenna.

The tuner 111 may be integrally embodied with the electronic apparatus 100, or embodied as a separate tuner electrically connected to the electronic apparatus 100. The external device 100-1 may include a tuner, and the electronic apparatus 100 may receive a broadcast signal that the external device 100-1 received through the tuner from the external device 100-1. The electronic apparatus 100 may further include a demodulator (not shown).

The demodulator may receive and demodulate a digital IF signal (DIF) converted by the tuner 111, and perform channel demodulation.

The memory 130 may be implemented as an internal memory such as a ROM (for example, electrically erasable programmable read-only memory (EEPROM)), a RAM, or a separate memory from the processor 120. In this case, the memory 130 may be implemented in the form of a memory embedded in the electronic apparatus 100, or a removable memory in the electronic apparatus 100, depending on the purpose of data storage. For example, data for driving the electronic apparatus 100 may be stored in a memory embedded in the electronic apparatus 100, and data for an expansion function of the electronic apparatus 100 may be stored in a memory attachable to or detachable from the electronic apparatus 100. The memory embedded in the electronic apparatus 100 may be embodied with at least one of a volatile memory (e.g., dynamic RAM, (DRAM), or static RAM (SRAM), synchronous dynamic RAM (SDRAM), or the like), a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (such as NAND flash or NOR flash), a hard drive, or a solid state drive (SSD). The memory removable from the electronic apparatus 100 may be embodied with a memory card (e.g., a compact flash, a secure digital (SD), a micro secure digital (SD), a mini secure digital (SD), an extreme digital (xD), a multi-media card (MMC), or the like), an external memory connectable to a USB port (e.g., a USB memory), or the like.

The processor 120 may be configured to control the overall operation of the electronic apparatus 100. For example, the processor 120 may control a plurality of hardware or software constituent elements connected to the processor 120 by driving an operation system, and applications, and perform various data processing and calculations.

The communicator 110 may be configured to various types of external devices according to various types of communication methods. The communicator 110 may include a communication interface 110-1 and an input/output interface 110-2.

The communication interface 110-1 may be configured to perform communication with various types of external devices according to various types of communication methods. The communication interface 110-1 may include a Wi-Fi chip, a Bluetooth chip, an infrared communication chip, a wireless communication chip, and the like. The processor may perform communication with various external devices by using the communication interface 110-1.

The communication interface 110-1 may perform communication with other external devices. The external device may be an electronic apparatus that outputs image contents. For example, when the external device is a TV, the type of external device may be an image device, and output data information of the TV may include the model name of the TV, the audio characteristic of output contents of the TV, the frequency characteristic of output audio among output contents of the TV, etc., but the disclosure is not limited thereto. The external device through which the communication interface 110-1 communicates may include a remote controller, a Bluetooth speaker, a lighting device, a smart cleaner, a smart refrigerator, an IOT home manager, etc., in addition to a device capable of outputting image contents.

The W-Fi chip or a Bluetooth chip may perform communication using a W-Fi method, and a Bluetooth method, respectively. When the Wi-Fi chip or the Bluetooth chip is used, various connectivity information such as an SSID and a session key may be transmitted and received first, communication connection may be established based on the connectivity information, and various information may be transmitted and received based thereon.

The infrared communication chip may perform communication according to an infrared data association (IrDA) technology for transmitting data wirelessly at a short distance using an infrared ray between a time ray and a millimeter wave.

The wireless communication module may include at least one communication chip for forming communication according to various communication standards such as IEEE, ZigBee, 3rd Generation (3G), 3rd Generation Partnership Project (3GPP), Long Term Evolution (LTE), $4^{th}$ Generation (4G), $5^{th}$ Generation (5G), or the like.

According to an embodiment, the communication interface 110-1 may use a Wi-Fi module to communicate with an external device such as a remote controller and an external server. When the communication interface 110-1 is embodied as a plurality of communicators, the communication interface 110-1 may use a communicator including at least one of an Ethernet modem or a WiFi module to perform communication with an external sever, or a communicator including a BT module to perform communication with an external device such as a remote controller. However, it is only exemplary, and the disclosure is not limited thereto.

The input/output interface 110-2 may be an interface of any one of a high-definition multimedia interface (HDMI), a mobile high-definition link (MHL), a universal serial bus (USB), a display port (DP), a thunderbolt, a Video Graphics Array (VGA) port, an RGB port, a D-subminiature (D-SUB), and a digital visual interface (DVI).

HDMI may be an interface capable of transmitting high-performance data for AV devices that output audio and video. DP may be an interface capable of realizing ultra-high resolution screen such as 2560×1600 or 3840×2160, 3D image as well as 1920×1080 full HD, and also transmitting digital voice. Thunderbolt may be an input/output interface for high-speed data transfer and connection, and may connect all of PC, display, storage device, etc. through a single port.

The input/output interface 110-2 may input and output at least one of audio signals and video signals.

According to an embodiment, the input/output interface 110-2 may include a port for inputting/outputting only audio signals, and a port for inputting/outputting only video signals as being separate ports, or embodied as a single port that inputs and outputs both audio signals and video signals.

The processor 120 may control the operation of the electronic apparatus 100 overall by using various programs stored in the memory 130.

The processor 120 may include a RAM 121, a ROM 122, a main CPU 123, first to nth interface 124-1 to 124-n, and a bus 125.

The RAM 121, the ROM 122, the main CPU 123, and the first to nth interface 124-1 to 124-n may be connected one another through the bus 125.

The ROM 122 may store a command set, etc. for system booting. If a turn-on command is input and power is supplied, the CPU 123 may copy the operation system stored in the memory 130 to the RAM 121 according to the command stored in the ROM 122, execute the operation system and perform booting of the system. When the booting is completed, the CPU 123 may copy various programs stored in the memory 130 to the RAM 121, execute the application program copied to the RAM 121 and perform various operations.

The main CPU 123 may access the memory 130, and perform booting by using the O/S stored in the memory 130. The main CPU 123 may perform various operations by using various programs, contents data, etc. stored in the memory 130.

The first to nth interface 124-1 to 124-n may be connected to the various constituent elements as described above. One of the interfaces may be a network interface connected to an external apparatus through a network.

The processor 120 may perform a graphic processing (video processing). The processor 120 may generate a screen including various objects such as icons, images, texts, etc. by using a calculation unit (not shown) and a rendering unit (not shown). The calculation unit (not shown) may calculate attribute values such as coordinate values, shapes, sizes, colors, etc. of the objects according to the layout of the screen by using the received control command. The rendering unit (not shown) may generate screens of various layouts including objects based on the attribute values calculated by the calculation unit (not shown). The processor 120 may be configured to perform processing of audio data. The processor 120 may perform various processing on video data such as decoding, amplification, noise filtering, etc.

The processor 120 may be configured to perform processing of audio data. The processor 120 may perform various image processes such as decoding, scaling, noise filtering, frame rate conversion, resolution conversion, etc. of audio data.

The user interface 140 may be implemented as a device such as a button, a touch pad, a mouse, and a keyboard, or a touch screen capable of performing the above-described display function and operation input function. The button may be various types of buttons such as a mechanical button, a touch pad, a whirl, etc. provided in a random area such as a front surface unit, a side surface unit, and a rear surface unit of the outside of the body of the electronic apparatus 100.

The electronic apparatus 100 may be embodied as an apparatus without a display, and transmit an image signal to a separate display device.

The electronic apparatus 100 may receive a user voice signal from an external control device including a microphone. In this case, the received user voice signal may be a digital voice signal, but according to an example embodiment, it could be an analog voice signal. For example, the electronic apparatus 100 may receive user voice signals through a wireless communication method such as Bluetooth or W-Fi. The external control device may be embodied as a remote control device or a smart phone in which an application for controlling the electronic apparatus 100 is installed.

The electronic apparatus 100 may transmit the voice signal to the external server for the voice recognition of the voice signal received from the external control device.

In this case, the communication module for performing communication with an external control device or an external server may be embodied as a signal one, or separated ones.

For example, the electronic apparatus 100 may perform communication with the external control device using a Bluetooth module, and perform communication with the external server using an Ethernet modem or a Wi-Fi module.

The electronic apparatus 100 according to an embodiment may transmit the received digital voice signal to the voice recognition server. In this case, the voice recognition server may covert digital voice signals into text information using Speech To Text (STT). The voice recognition server may transmit the text information to another server or the electronic apparatus to perform search corresponding to the text information, and in some cases, directly perform a search job.

The electronic apparatus 100 may receive an analog voice signal, and digitalize the analog voice signal, and transmit a digital voice signal to the voice recognition server. The electronic apparatus 100 may transmit the analog voice signal to the voice recognition server, and the voice recognition server may digitalize the analog voice signal.

The electronic apparatus 100 may directly apply the Speech To Text (STT) to the digital voice signal and convert the digital voice signal into text information, and transmit the text information to the external server.

Figure 2C:
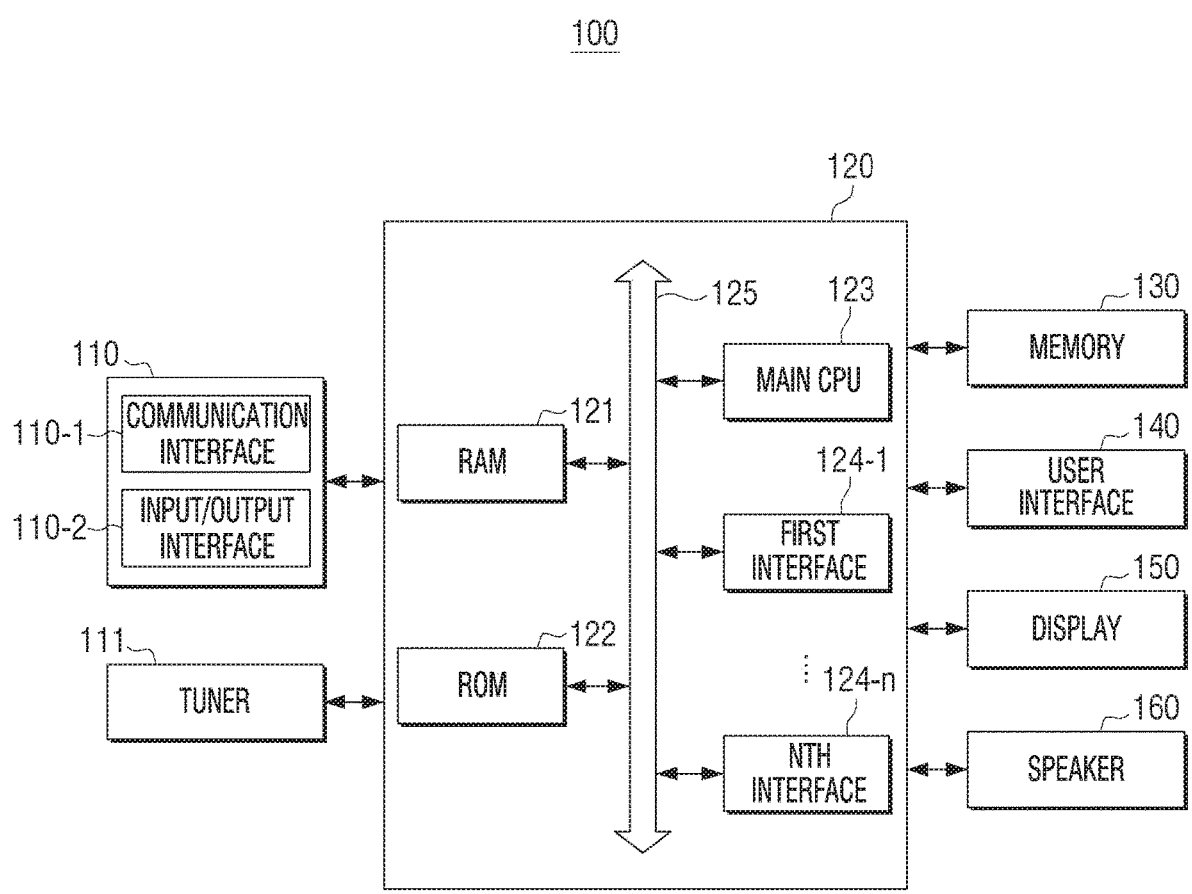
FIG. 2C is a block diagram illustrating another example of detailed configurations of an electronic apparatus.

FIG. 2C is a block diagram illustrating another example of detailed configurations of an electronic apparatus. The electronic apparatus 100 may include a communicator 110, a tuner 111, a processor 120, a memory 130, a user interface 120, a display 150 and a speaker 160. The detailed description of constituent elements of FIG. 2C which are repeated in FIG. 2B will be omitted.

The display 150 may be implemented as various types of displays such as a Liquid Crystal Display (LCD), an Organic Light Emitting Diodes (OLED) display, a Plasma Display Panel (PDP), and the like. The display 140 may also include a driving circuit, a backlight unit, etc., which may be implemented in the form of an a-si TFT, a low temperature poly silicon (LTPS) TFT, an organic TFT (OTFT), etc. Meanwhile, the display 150 may be implemented as a touch screen in combination with a touch sensor, a flexible display, a three dimensional display (3D display), etc.

The display 150 may include a display panel for outputting images as well as a bezel for housing the display panel. The bezel according to an embodiment may include a touch sensor (not shown) for sensing user interaction.

The speaker 160 may be a constituent element for outputting various alarming sounds or voice messages as well as various audio data processed by the input/output interface 110-2.

The electronic apparatus 100 may further include a microphone (not shown). The microphone may be an element for receiving user voices and other sounds and converting the user voices and other sounds into audio data.

The microphone (not shown) may receive a user voice in an activation state. For example, the microphone may be integrally embodied with the electronic apparatus 100 on its upper side, front side, or another side. The microphone may have various constituent elements such as a microphone for collecting user voices in the analog format, an amplification circuit for amplifying the collected user voices, an A/D conversion circuit for sampling the amplified user voice and converting the user voice into a digital signal, a filter circuit for removing noise components from the digital signal, etc.

The electronic apparatus 100 may obtain word-related information from multimedia data, and transmit the obtained word-related information to the server 300 to identify broadcast information corresponding to the external device 100-1.

Figure 3:
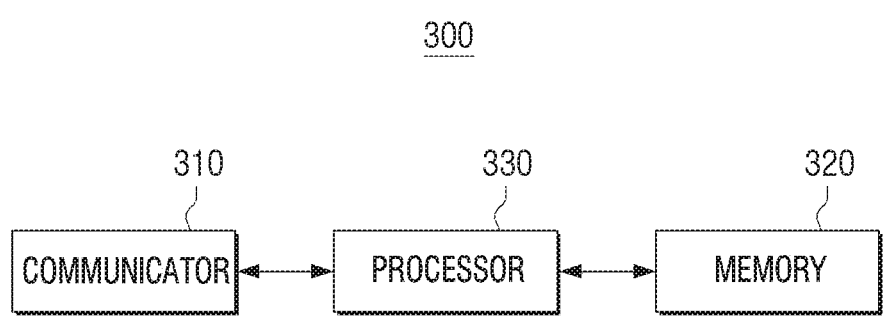
FIG. 3 is a block diagram illustrating an example of configurations of a server according to an embodiment of the disclosure.

FIG. 3 is a block diagram illustrating an example of configurations of a server according to an embodiment of the disclosure.

Referring to FIG. 3, a server 300 may include a communicator 310, a memory 320, and a processor 330.

The communicator 310 may be configured to perform communication with the electronic apparatus 110 and the another electronic apparatus 200. The communicator 310 may support various communication interfaces such as BlueTooth (BT), Bluetooth Low Energy (BLE), Wireless Fidelity (WI-FI), Zigbee, etc. However, the disclosure is not limited thereto. Any communication interface may be used as long as wireless communication is possible. However, the disclosure is not limited thereto. Any type of communication interface could be used as long as it could perform wireless communication.

The communicator 310 may receive identification information corresponding to multimedia data from the electronic apparatus 100, and transmit broadcast provider information corresponding to the identification information to the electronic apparatus 100. The communicator 310 may receive the broadcast provider information and the identification information from the another electronic apparatus 200.

The communicator 310 may include a communication interface of all communication standards capable of performing wired communication with various devices other than the above-described communication interface.

The memory 320 may store a time period based word related information database which corresponds to each broadcast provider. The word-related information database may include word-related information corresponding to each of a plurality of channels provided through the broadcast provider for each time period. The word-related information database may include word-related information segmented considering region information.

The memory 320 may be embodied as a hard disk, a non-volatile memory, and a volatile memory, and any type of configuration could be used as long as it could store data.

The processor 330 may control the operation of the electronic apparatus 100.

According to an embodiment, the processor 330 may be implemented as a digital signal processor (DSP), a microprocessor, or a time controller (TCON), but is not limited thereto. The processor 330 may include one or more central processing unit (CPU), a microcontroller unit (MCU), a micro processing unit (MPU), a controller, an application processor (AP), or a communication processor (CP), an ARM processor, and the like, or may be defined by the corresponding terms. The processor 330 may be implemented as a system on chip (SoC), a large scale integration (LSI) with a built-in processing algorithm, or in the form of a field programmable gate array (FPGA). The processor 330 may perform various functions by executing computer executable instructions stored in the memory.

The processor 330 may identity the broadcast provider information corresponding to the identification information received from the electronic apparatus 100 through the communicator 310 based on the word-related information database, and control the communicator 310 to transmit the identified broadcast provider information to the electronic apparatus 100. The word-related information database may include the word-related information corresponding to each of a plurality of channels provided through the broadcast provider for each time period, and may be the information stored in the server 300 before the identification information is received from the electronic apparatus 100. The word related information database may be updated in real time.

The processor 330, based on identification information and a channel number corresponding to the identification information being received from the electronic apparatus 100 through the communicator 310, may identify the broadcast provider information corresponding to the identification information and the channel number based on the word-related information database, and control the communicator 310 to transmit the identified broadcast provider information to the electronic apparatus 100.

The processor 330 may consider the channel number as well as the identification information to identify the broadcast provider information. The processor 330 may identify the broadcast provider information further considering the IP information.

The processor 330 may update the word-related information databased based on the broadcast provider information received from the another electronic apparatus 200 and the word-related information by time period corresponding to the broadcast provider information. For example, the processor 330 may update the word-related information by time period of a streaming content.

The word-related information may include the frequency of each of the plurality of words obtained during the time period, and the processor 330, based on a plurality of broadcast providers being identified from the word-related information database based on the plurality of words, may identify one of the plurality of broadcast providers identified based on the frequency of each of the plurality of words.

The identification information may include the word-related information corresponding to each of the plurality of time periods, and the processor 330, when the broadcast provider information coincides with the word-related information based on the word-related information database, may control the communicator 310 to transmit the broadcast provider information to the electronic apparatus 100.

The server 300 may establish the word-related information database based on the information received from the another electronic apparatus 200, identify the broadcast provider information based on the identification information received from the electronic apparatus 100 and transmit the identified broadcast provider information to the electronic apparatus 100.

The operations of the electronic apparatus 100, the another electronic apparatus 200 and the server will be described in detail with reference to accompanying drawings.

Figure 4A:
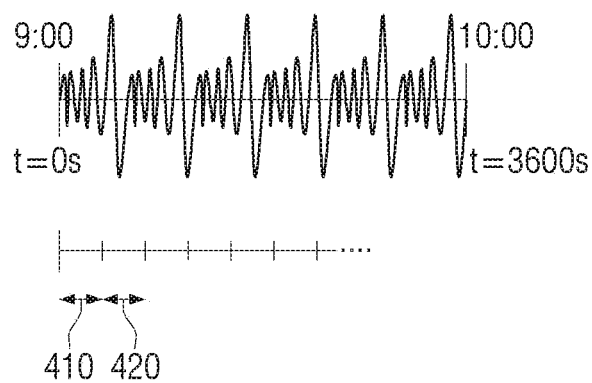
FIG. 4A and FIG. 4B are views to explain word related information according to an embodiment of the disclosure.
Figure 4B:
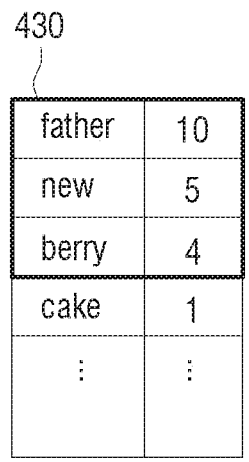

FIG. 4A and FIG. 4B are views to explain word related information according to an embodiment of the disclosure.

When multimedia data is received from the external device 100-1, the processor 120 may obtain the word-related information during the time period from audio data included in the multimedia data. For example, referring to FIG. 4A, the processor 120 may divide audio data into 5-minute intervals 410, 420, . . . , and obtain the word-related information from the audio data in 5-minute intervals.

To be specific, the processor 120 may obtain the word identified during a first time period 410 and the number of times of use of each identified word. For example, referring to FIG. 4B, the processor 120 may obtain the identified word and the number of times of uses of the identified word such as father for 10 times, new for 5 times, berry for 4 times, cake for one time, etc.

The processor 120 may transmit the entity of the identified words and the number of times of use of the words to the server 300 as word-related information. However, the disclosure is not limited thereto. The processor 120 may transmit part of the identified words and the number of times of use of the part of the words to the server 300 as the word-related information. For example, the processor 120 may transmit a part 430 of words of which number of times of use is three or more times and the corresponding number of times of use of the words to the server 300 as the word-related information. The processor 120 may transmit the predetermined number of words to the server 300 as the word-related information in the descending order of the number of times of use. The processor 120 may transmit the word-related information and the identification information including a reproduction time point of the multimedia data corresponding to the time period to the server 300.

The time period may be set based on an absolute time. For example, if the time period is divided by 5-minute interval such as 9:00~9:05, 9:05~9:10 . . . , and multimedia data is input into the processor 120 after 9:03, the word-related information may not be obtained during the time period of 9:00 to 9:05, and the word-related information may be obtained in 5-minute intervals after 9:05.

The another electronic apparatus 200 and the server 300 may use the time period same as the electronic apparatus 100. The electronic apparatus 100, the another electronic apparatus 200, and the server may have the same reference point and the size of the time period.

Figure 5:
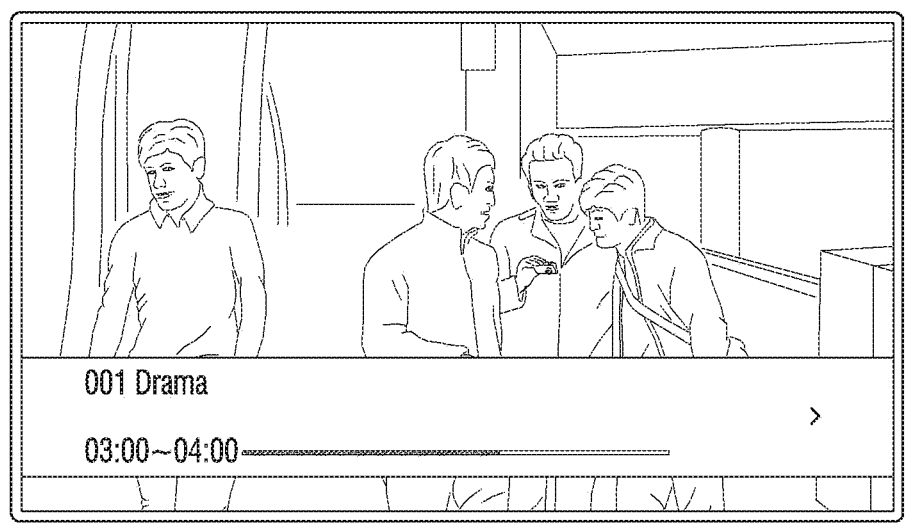
FIG. 5 is a view to explain an operation to improve identification accuracy of broadcasting provider information according to an embodiment of the disclosure.

FIG. 5 is a view to explain an operation to improve identification accuracy of broadcasting provider information according to an embodiment of the disclosure. Referring to FIG. 4, it has been described that the electronic apparatus 100 transmits the word-related information and the identification information including a reproduction time to the server 300, and such information may be minimum information required for identifying the broadcast provider information. In other words, the electronic apparatus 100 may further transmit additional information to the server 300 to easily identify broadcast provider information, thereby improving accuracy.

The processor 120 may identify a channel number from a plurality of frames included in multimedia data, and transmit the identified channel number to the server 300 together with the identification information. For example, referring to FIG. 5, the processor 120 may receive multimedia data including OSD information in the case of turn-on, channel change, etc. of the external device 100-1, apply OCR to the frame including the OSD information, and identify a channel number.

However, the disclosure is not limited thereto. The processor 120 may identify at least one of channel name, content title, performer, etc. from the plurality of frames included in the multimedia data through the OCR, and transmit the identified one to the server 300 together with the identification information. In this case, the server 300 may identify the channel number based on at least one of the channel number, the contents title, the performer, etc., and transmit the broadcast provider information corresponding to the identified channel number and the identification information to the electronic apparatus 100.

The processor 120 may identify an object from the plurality of frames included in the multimedia data and transmit the identified object to the server 300 together with the identification information. The server 300 may identify a channel number based on the recognized object and EPG information, and transmit the broadcast provider information corresponding to the identified channel number and the identification information to the electronic apparatus 100.

For example, the processor 120 may recognize a cat image from the plurality of frames included in the multimedia data, and transmit 'cat' to the server 300 together with the identification information. In this case, the server 300 may identify a channel number that provides 'cat' documentary based on the EPG information, and transmit the broadcast provider information corresponding to the identified channel number and the identification information to the electronic apparatus 100.

The processor 120 may transmit the IP information of the electronic apparatus 100 to the server 300 together with the identification information.

The processor 120 may provide identification information to the server 300, and receive the broadcast provider information corresponding to the identification information from the server 300.

Figure 6:
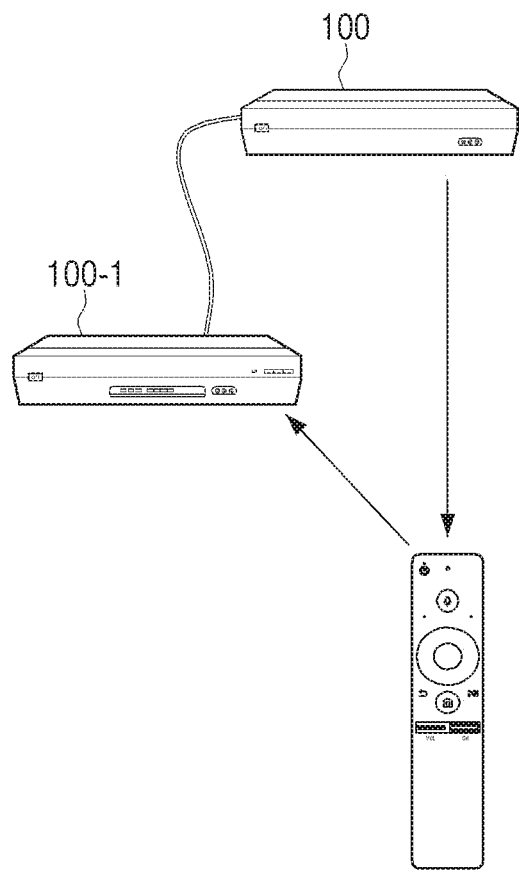
FIG. 6 is a view to explain a method for setting a control code set for an external server according to an embodiment of the disclosure.

FIG. 6 is a view to explain a method for setting a control code set for an external server according to an embodiment of the disclosure.

When the broadcast provider information is received, the processor 120 may provide various services to the user. The processor 120 may transmit a control code set for controlling the external device 100-1 to a remote control device for controlling the electronic apparatus 100. In this case, the user may control the external device 100-1 as well as the electronic apparatus 100 by using a remote control device without a separate integrated remote controller setting operation.

Referring to FIG. 6, the processor 120 may control the communicator 110 to transmit the control code set corresponding to the broadcast provider information to the remote control device, and the control code set may be stored in the memory 130 of the electronic apparatus 100 or received from the server.

The processor 120 may control the communicator 110 to transmit the broadcast provider information to another server, and receive broadcast guide information corresponding to a broadcast provider from another server through the communicator 110. The processor 120 may provide at least one of commercial service, voice service or contents recommendation service based on the broadcast guide information. However, the disclosure is not limited thereto, but any sort of service could be used as long as it provides broadcast guide information.

Figure 7:
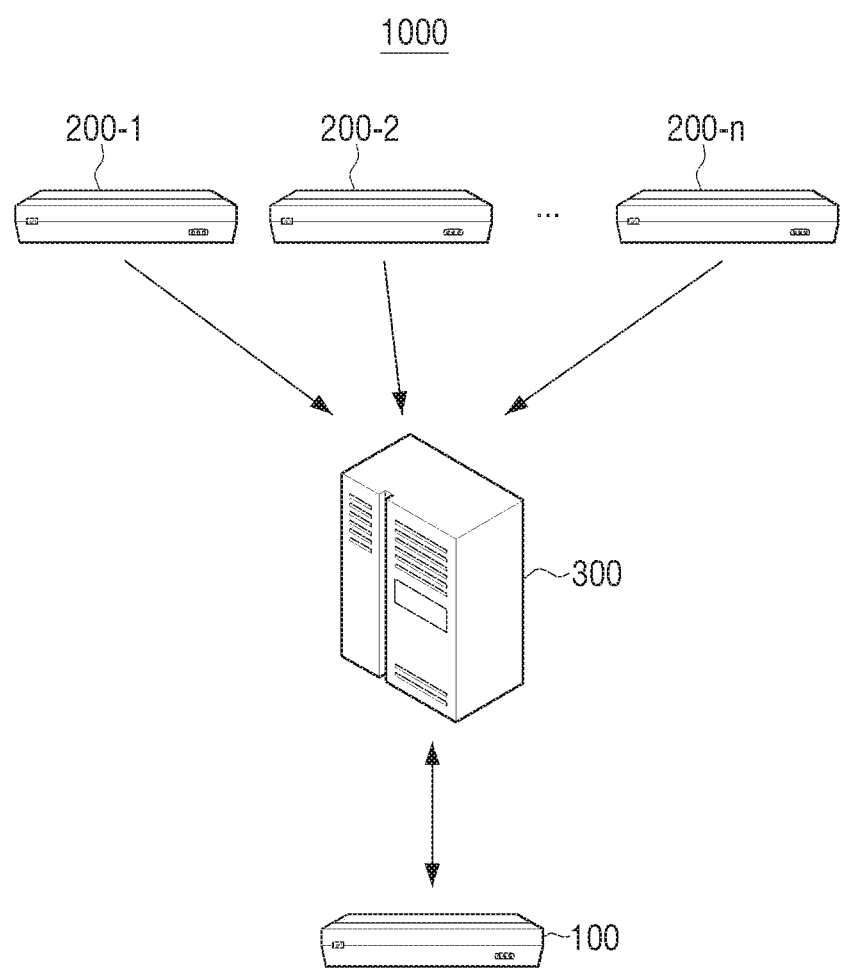
FIG. 7 is a view to explain an establishing method for word related information database according to an embodiment of the disclosure.

FIG. 7 is a view to explain an establishing method for word related information database according to an embodiment of the disclosure.

Referring to FIG. 7, an electronic system 1000 may include a plurality of another electronic apparatuses 200-1, 200-2, . . . , and 200-*n*.

Each of the plurality of another electronic apparatuses 200-1, 200-2, . . . , and 200-*n* may store the broadcast provider information. When the multimedia data is received from the corresponding external device, each of the plurality of another electronic apparatuses 200-1, 200-2, . . . , and 200-*n* may obtain the word-related information during a time period from the audio data included in the multimedia data, and transmit the identification information including the word-related information and time information corresponding to the time period and the broadcast provider information to the server 300. The method for obtaining the word-related information may be the same as that of the electronic apparatus 100, and the time information corresponding to the time period may include a reproduction time point of the multimedia data corresponding to the time period.

Each of the plurality of another electronic apparatuses 200-1, 200-2, . . . , and 200-*n* may identify a channel number from video data included in the multimedia data, and transmit at least one of a channel number and the corresponding IP information to the server 300 along with the identification information and the broadcast provider information. The method for identifying the channel number may be the same as that of the electronic apparatus 100.

The server 300 may establish a word-related information database based on the information received from the plurality of another electronic apparatuses 200-1, 200-2, . . . , and 200-*n*, and update the word-related information database in real time.

The electronic apparatus 100 may be an apparatus where the broadcast provider information corresponding to the external device 100-1 is not stored. The electronic apparatus 100 may transmit the identification information to the server 300, and receive the broadcast provider information corresponding to the identification information. The electronic apparatus 100 may operate in the same manner as the plurality of another electronic apparatuses 200-1, 200-2, . . . , and 200-*n* after the broadcast provider information is received.

FIG. 8 is a view to explain a broadcasting provider identification method according to an embodiment of the disclosure.

The server 300 mays store the word-related information database. For example, the server 300 may store the word-related information database as shown in FIG. 8. FIG. 8 illustrates an area in which most channel numbers cross time periods as in blank, but it is for ease of explanation with a schematic view. In the actual embodiment, word-related information may be stored in an area illustrated as a blank space. Even if the area is a blank space in the actual embodiment, the server 300 may update the blank space to the word-related information based on the information received from the another electronic apparatus 200.

FIG. 8 illustrates that the word-related information database includes the word-related information corresponding to each of a plurality of channels provided through a broadcast provider for each time period, but the disclosure is not limited thereto. For example, the word-related databased may include the segmented word-related information further considering region information. For example, channel no. 5 of broadcast provider A may be divided into region 1 and region 2, and each of them may store different word-related information.

The server 300 may receive identification information and broadcast provider information from the another electronic apparatus 200. The sever 300 may further receive a channel number from the another electronic apparatus 200. The identification information may store word-related information and a reproduction time point.

The server 300 may store word-related information corresponding to the received broadcast provider information, channel information and the reproduction time point. The server 300 may repeat the operation with respect to the plurality of another electronic apparatuses 200-1, 200-2, . . . , and 200-*n* to establish word-related information database, and update the database in real time.

The server 300 may distinguish the electronic apparatus 100 from the another electronic apparatus 100 according to whether the received information includes broadcast provider information. The server 300, if the received information includes broadcast provider information, may update the word-related information database based on the received information, and if the received information does not include the broadcast provider information, may transmit the broadcast provider information corresponding to the received information to the electronic apparatus 100. The method for identifying broadcast provider information will be described below.

The server 300 may receive identification information from the electronic apparatus 100, and identify the broadcast provider information corresponding to the identification information from the word-related information database. For example, when receiving word-related information of father 10 times, new 5 times, and berry 4 times is received from the electronic apparatus 100, the sever 300 may identify the broadcast provider information, the channel number, the time period, etc. including father, new and berry from the word-related information database. When region 810 includes the same word, and the same word is not identified in a different region, the server 300 may transmit information on broadcast provider A corresponding to the 810 region to the electronic apparatus 100.

The word-related information database may include a plurality of regions including father, new, and berry. For example, referring to FIG. 8, region 820 may include father 9 times, new 5 times, and berry 4 times, and in this case, the server 300 may transmit the information on the broadcast provider A to the electronic apparatus 100 based on the frequency of words included in regions 810 and 820.

When region 820 of FIG. 8 includes father 10 times, new 5 times, and berry 4 times, the server 300 may transmit information on at least one of broadcast provider A and broadcast provider B to the electronic apparatus 100 based on the channel number received from the electronic apparatus 100.

When region 820 of FIG. 8 includes father 10 times, new 5 times, and berry 4 times, and the channel number is not received from the electronic apparatus 100, the server 300 may identify broadcast provider information after receiving additional identification information. For example, the server 300 may further receive word-related information including father 15 times, berry 9 times, and cake one time from the electronic apparatus 100, and transmit the information on broadcast provider A to the electronic apparatus 100.

When region 830 of FIG. 8 includes father 10 times, new 5 times, and berry 4 times, the server 300 may not identify the broadcast provider information even if the channel number is received from the electronic apparatus 100. Therefore, the server 300 may identify the broadcast provider information after receiving additional identification information.

FIG. 8 illustrates that only three words are included in a region, but any number of words can be included.

The server 300 may compare a plurality of time periods and provide the broadcast provider information to the electronic apparatus 100. For example, the server 300 may receive word-related information with respect to five time periods at minimum from the electronic apparatus 100, and transmit the broadcast provider information to the electronic apparatus 100 only when the word-related word information coincides with broadcast provider information corresponding to the time period of a predetermined ratio or more.

FIG. 9 is a flowchart to explain a control method of an electronic apparatus according to an embodiment of the disclosure.

When receiving multimedia data from an external device, word-related information during a time period may be obtained from audio data included in the multimedia data at operation S910. The identification information including the word related information and the time information corresponding to the time period may be transmitted to the server at operation S920. The broadcast provider information corresponding to the identification information transmitted from the server may be received at operation S930.

The operation may further include transmitting broadcast provider information to another server, and based on broadcast guide information corresponding to the broadcast provider being received from another server, providing at least one of commercial service, voice service, or contents recommendation service based on the broadcast guide information.

The operation may further include identifying a channel number from video data included in multimedia data, and the transmitting operation S920 may include transmitting at least one of the channel number and the IP information of the electronic apparatus to the server together with the identification information.

The operation may further include displaying a plurality of frames included in the video data sequentially, and the identifying may include identifying the channel number from the displayed frame among a plurality of frames.

The obtaining operation S910 may further include converting audio data during a time period into text, identifying the frequency of each word included in the audio data based on the text, and obtaining word related information including information on words of a predetermined frequency or more.

The operation may further include transmitting a control code set corresponding to the broadcast provider information among a plurality of control code sets to the remote control device.

The transmitting operation S920 may transmit first identification information including the first production time point of the multimedia data corresponding to the time period and corresponding word related information, and second identification information including a second reproduction time of the multimedia data corresponding to the time period and corresponding word related information to the server.

According to various embodiments of the disclosure, an electronic apparatus may obtain word related information from audio data and transmit the word-related information to the server, and receive the broadcast provider information obtained from the server based on the word-related information.

In the above description, it is assumed that a channel and a channel number thereof provided for each broadcast provider is different, and in most cases, this sort of assumption makes no problems. Specifically, although there is a broadcast provider having the same channel and channel number, it may be possible to distinguish a broadcast provider because a home channel of the broadcast provider is different. For example, the channel numbers of the home channel of the broadcasting provider could be different from each other, and even if the channel numbers are the same, the contents to be provided may be different for each broadcasting provider. Therefore, it may be possible to distinguish a broadcast provider.

The methods according to various example embodiments of the disclosure may be embodied in the form of application that can be installed on a conventional electronic apparatus.

The methods according to various example embodiments of the disclosure may be embodied as software upgrade or hardware upgrade with respect to a conventional electronic apparatus.

In addition, various example embodiments of the disclosure can be performed through an embedded server, or an external server of at least one of an electronic apparatus or a display device.

Various embodiments of the present disclosure may be embodied as software including commands stored in machine-readable storage media that can be read by a machine (e.g., a computer). The machine may be an apparatus that calls a command stored in a storage medium and is operable according to the called command, including an electronic apparatus in accordance with the disclosed example embodiments (e.g., an electronic apparatus (A)). When the command is executed by a processor, the processor may perform the function corresponding to the command, either directly or under the control of the processor, using other components. The command may include code generated or executed by a compiler or an interpreter. The machine-readable storage medium may be provided in the form of a non-transitory storage medium. The 'non-temporary' means that the storage medium does not include a signal but is tangible, but does not distinguish whether data is stored semi-permanently or temporarily on a storage medium.

According to an embodiment, the method according to various embodiments disclosed herein may be provided in a computer program product. A computer program product may be traded between a seller and a purchaser as a commodity. A computer program product may be distributed in the form of a machine-readable storage medium (e.g., compact disc read only memory (CD-ROM)) or distributed online through an application store (e.g., PlayStore™) In the case of on-line distribution, at least a portion of the computer program product may be temporarily stored, or temporarily created, on a storage medium such as a manufacturer's server, a server of an application store, or a memory of a relay server.

Each of the components (e.g., modules or programs) according to various embodiments may consist of a single entity or a plurality of entities, and some subcomponents of the abovementioned subcomponents may be omitted, or other components may be further included in various embodiments. Alternatively or additionally, some components (e.g., modules or programs) may be integrated into one entity to perform the same or similar functions performed by each component prior to integration. Operations performed by modules, programs, or other components, in accordance with various embodiments, may be executed sequentially, in parallel, repetitively, or heuristically, or at least some operations may be performed in a different order, or omitted, or another function may be further added.

Although embodiments have been shown and described, it will be appreciated by those skilled in the art that changes may be made to these embodiments without departing from the principles and spirit of the disclosure. Accordingly, the scope of the disclosure is not construed as being limited to the described embodiments, but is defined by the appended claims as well as equivalents thereto.

What is claimed is:

1. An electronic apparatus comprising:
a communicator; and
a processor configured to:
    receive, through the communicator, multimedia data, including audio data, from an external device corresponding to a broadcast provider from among a plurality of broadcast providers,
    obtain word-related information identifying a frequency of words occurring in the audio data during a time period,
    control the communicator to transmit the word-related information, time information corresponding to the time period, and IP information of the electronic apparatus, to a server, to thereby allow the server to identify the broadcast provider based on the word-related information, the time information, and the IP information of the electronic apparatus, and
    receive, through the communicator, information indicating the identity of the broadcast provider as identified by the server.

2. The electronic apparatus as claimed in claim 1, wherein the processor is further configured to:
    control the communicator to transmit the information indicating the identity of the broadcast provider to another server,
    receive broadcast guide information corresponding to the broadcast provider from the another server through the communicator, and
    provide at least one of a commercial service, a voice service, or a content recommendation service based on the broadcast guide information.

3. The electronic apparatus as claimed in claim 1, wherein the processor is further configured to:
    identify a channel number from video data included in the multimedia data, and
    control the communicator to transmit the identified channel number, to thereby allow the server to further identify the broadcast provider based on the identified channel number.

4. The electronic apparatus as claimed in claim 3, further comprising:
a display,
    wherein the processor is further configured to:
        control the display to sequentially display a plurality of frames included in the video data, and
        identify the channel number from a frame among the displayed plurality of frames.

5. The electronic apparatus as claimed in claim 1, wherein the processor is further configured to:
    convert the audio data received during the time period into text,
    identify a respective frequency for words included in the audio data based on the text, and
    obtain word-related information including information on words where the respective frequency is greater than or equal to a predetermined threshold,
    to thereby identify the frequency of words occurring in the audio data.

6. The electronic apparatus as claimed in claim 1, further comprising:
a memory configured to store a plurality of control code sets,
    wherein the processor is further configured to control the communicator to transmit, to a remote control device, a control code set corresponding to the information indicating the identity of the broadcast provider among the stored plurality of control code sets.

7. The electronic apparatus as claimed in claim 1, wherein the time information corresponding to the time period includes a reproduction time point of the multimedia data corresponding to the time period.

8. The electronic apparatus as claimed in claim 7, wherein the processor is further configured to control the communicator to transmit to the server:
    a first reproduction time point of the multimedia data corresponding to the time period and word-related information corresponding to the time period, and
    a second reproduction time point of the multimedia data corresponding to the time period and word-related information corresponding to the time period.

9. The electronic apparatus as claimed in claim 1, further comprising:
a memory,
    wherein the processor is further configured to:
        store the received information indicating the identity of the broadcast provider in the memory,
        obtain the word related information from the multimedia data after the information indicating the identity of the broadcast provider is received, and
        control the communicator to transmit the word-related information to the server along with the information indicating the identity of the broadcast provider.

10. An electronic system, comprising:
a server configured to store a word-related information database including word-related information stored by time period, IP information, and a plurality of broadcast providers; and
an electronic apparatus configured to receive multimedia data, including audio data, from an external device corresponding to a broadcast provider from among the plurality of broadcast providers for a time period, obtain word-related information during the time period from the audio data included in the multimedia data, and transmit identification information to the server, the identification information including the word-related information, time information corresponding to the time period, and IP information of the electronic apparatus,
    wherein the server is further configured to identify information on the broadcast provider, providing the multimedia data to the electronic apparatus through the external device, by identifying the broadcast provider in the word-related information database based on the transmitted identification information, including the time information and the IP information, and transmit the identified information on the broadcast provider to the electronic apparatus.

11. The electronic system as claimed in claim 10, wherein the server is further configured to update the word-related information database based on information on the broadcast provider received from another electronic apparatus, and the word-related information by time period corresponding to the information on the broadcast provider received from the another electronic apparatus.

12. The electronic system as claimed in claim 10, wherein the word-related information database includes word-related information respectively corresponding to a plurality of channels provided through the broadcast provider for a plurality of time periods, and
wherein the server is further configured to receive a channel number corresponding to the identification information from the electronic apparatus, identify the identification information and the information on the broadcast provider corresponding to the channel number based on the word-related information database, and transmit the identified information on the broadcast provider to the electronic apparatus.

13. The electronic system as claimed in claim 10, wherein the word-related information includes a respective frequency for words obtained during the time period, and
wherein the server is further configured to identify a plurality of broadcast providers from the word-related information database based on the plurality of words, and identify one of the plurality of identified broadcast providers based on the respective frequency for the words.

14. The electronic system as claimed in claim 10, wherein the identification information includes word-related information corresponding to respective time periods, and
wherein the server is further configured to obtain the information on the broadcast provider respectively coinciding with the word-related information and respective time periods in the word-related information database, and transmit the information on the broadcast provider to the electronic apparatus.

15. A server comprising:
at least one memory; and
at least one processor coupled to the at least one memory to:
store, in a database, word-related information by time period, IP information, and broadcast provider of a plurality of broadcast providers,
receive identification information transmitted by an electronic device, the received identification information including word-related information obtained during a time period from audio data included in multimedia data, time information corresponding to the time period during which the word-related information was obtained, and IP information of the electronic apparatus,
identify, in the database, a broadcast provider of the plurality of broadcast providers that provided the multimedia data, based on the word-related information, the time information, and the IP information of the electronic apparatus included in the received identification information, and
transmit information indicated the identified broadcast provider to the electronic apparatus.

* * * * *

UNITED STATES PATENT AND TRADEMARK OFFICE
CERTIFICATE OF CORRECTION

PATENT NO. : 11,159,838 B2  
APPLICATION NO. : 16/552156  
DATED : October 26, 2021  
INVENTOR(S) : Eunjin Yoo et al.

Page 1 of 1

It is certified that error appears in the above-identified patent and that said Letters Patent is hereby corrected as shown below:

In the Claims

Column 24, Line 40:  
Claim 9, delete "word related" and insert --word-related--, therefor Signed and Sealed this  
Seventh Day of December, 2021

Drew Hirshfeld  
*Performing the Functions and Duties of the*  
*Under Secretary of Commerce for Intellectual Property and*  
*Director of the United States Patent and Trademark Office*